United States Patent [19]

Rasp et al.

[11] Patent Number: 5,401,798
[45] Date of Patent: Mar. 28, 1995

[54] GYPSUM-BASED MATERIALS, PROCESS FOR THEIR PREPARATION AND THEIR USE

[75] Inventors: Christian Rasp, Bergisch Gladbach; Jan Mazanek, Köln; Ulrich von Gizycki, Leverkusen, all of Germany

[73] Assignee: Bayer Aktiengesellschaft, Leverkusen, Germany

[21] Appl. No.: 101,326

[22] Filed: Aug. 2, 1993

Related U.S. Application Data

[63] Continuation-in-part of Ser. No. 894,412, Jun. 5, 1992, abandoned.

[30] Foreign Application Priority Data

Jun. 14, 1991 [DE] Germany ............... 41 19 665.1

[51] Int. Cl.$^6$ ............... C08J 5/10; C08K 3/30; C08L 71/00
[52] U.S. Cl. ............... 524/423; 523/111; 523/113; 524/4; 524/503; 524/507
[58] Field of Search ............... 524/4, 423, 503, 507; 523/111, 113

[56] References Cited

U.S. PATENT DOCUMENTS

| | | | |
|---|---|---|---|
| 4,293,474 | 10/1981 | Dieterich et al. | 260/29.2 TN |
| 4,544,683 | 10/1985 | Muller et al. | 523/111 |
| 5,091,497 | 2/1992 | Grogler et al. | 528/76 |

FOREIGN PATENT DOCUMENTS

| | | |
|---|---|---|
| 0054175 | 6/1982 | European Pat. Off. |
| 0128399 | 12/1984 | European Pat. Off. |
| 0238858 | 9/1987 | European Pat. Off. |
| 0403974 | 12/1990 | European Pat. Off. |
| 2050084 | 4/1972 | Germany. |
| WO91/00253 | 1/1991 | WIPO. |

Primary Examiner—Paul R. Michl
Assistant Examiner—U. K. Rajguru
Attorney, Agent, or Firm—Sprung Horn Kramer & Woods

[57] ABSTRACT

Materials based on gypsum and organic additives are improved if they contain polyethers and, if desired, polymers. They can be used in a wide range of areas, for example as slabs in the building sector and for improving plasters, mortars, insulating materials and other construction compositions, casts and/or moulds.

11 Claims, No Drawings

GYPSUM-BASED MATERIALS, PROCESS FOR THEIR PREPARATION AND THEIR USE

This application is a continuation-in-part of application Ser. No. 07/894,412, filed on Jun. 5, 1992, now abandoned.

The present invention relates to improved gypsum-based materials containing polyether polyol additives and to a process for their preparation. The improved materials are suitable, for example, for medical purposes (for example for casts and dental compositions), for the building sector (for example as seam-sealing compositions, plaster materials and for the production of finished parts), for the production of decorative moulded articles and for making ceramic moulds.

Anhydrous gypsum is used as water-hardening active ingredient for a wide range of applications, for example as material for plastering, for casts for immobilisation of parts of the body, as construction material in building-interior extension work and as modelling compositions. After soaking in water, anhydrous gypsum hardens with setting. However, the hardened gypsum also has serious disadvantages. It is, for example, not water-resistant and is so hard and brittle that it often breaks on exposure to mechanical stress.

There have already been attempts to improve the properties of set gypsum. Thus, German Offenlegungsschrift 3,320,217 states that gypsum can be mixed with aqueous polyurethane and/or polyurea dispersions, if appropriate with the addition of alcohols, without premature coagulation of the dispersion and after setting has improved water and breaking resistance. The disadvantage of gypsum modified in this manner is its poor reproducibility, in particular as a result of non-uniform air inclusions and the non-uniform flow behaviour.

Proposals to make gypsum more water-resistant for applications in the building sector by soaking in salt solutions, bitumen or plastic emulsions have not been successful (see "Blick durch die Wirtschaft" from 19.9.1982, No. 175, p. 7).

Materials based on gypsum and organic additives have now been found which are characterised in that they contain polyethers.

Materials according to the invention are distinguished by improved mechanical properties, improved processability and reduced water-absorption capacity.

Materials according to the invention can contain, for example, 0.02 to 5% by weight of polyether in the hardened state. This amount is preferably 0.03 to 2% by weight, particularly preferably 0.05 to 1% by weight.

Based on the not yet hardened gypsum, for example on the anhydrous gypsum or anhydrite used, materials according to the invention can be prepared, for example, with the addition of 18 to 400% by weight of water. This amount is preferably 30 to 100% by weight, particularly preferably 35 to 70% by weight.

The polyethers can be, for example, adducts of ethylene oxide and/or propylene oxide with starter molecules containing reactive hydrogen atoms. If ethylene oxide and propylene oxide were used for adduct formation with the starter molecules, this can have taken place simultaneously (which produces a random distribution of ethylene oxide and propylene oxide units) or in succession in any desired order (which produces a block-like distribution of ethylene oxide and propylene oxide units). Mixtures of polyethers of different composition can also be used, for example mixtures of monofunctional polyethers with polyfunctional polyethers, mixtures of random polyethers and block copolyethers or mixtures of polyethers of the formulae (I) to (IV). The polyethers to be used according to the invention can contain hydroxyl groups and terminal groups formed by reaction of the hydroxyl groups, for example ester, ether, urethane or carbonate groups. Analogously, amino polyethers can contain amide or imide groups.

Preferred polyethers have the formulae (I) and/or (II)

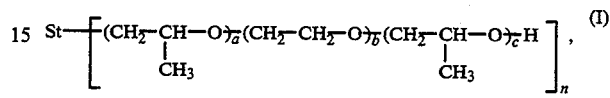

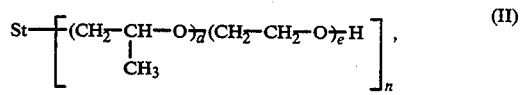

in which

St represents the radical of a starter molecule, for example the radical of propylene glycol, trimethylolpropane, glycerol, sorbitol, ethylenediamine, stearylamine, ammonia or hydroxyl-containing polysiloxane, n represents the number of reactive hydrogen atoms originally present in the starter molecule, a represents an integer or a fractional number from 17 to 23, preferably 19 to 21, b represents an integer or a fractional number from 3 to 6, preferably 3 to 4, c represents an integer or a fractional number from 1 to 6, preferably 1 to 3, d represents an integer or a fractional number from 17 to 23, preferably 19 to 22, and e represents an integer or a fractional number from 3 to 15, preferably 4 to 7.

If one or more of numbers a to e represent a fractional number, these are average numbers characterising mixtures of different molecules of the formulae ( I ) and/or ( II ).

Further preferred polyethers are products obtained by reacting vegetable or animal fats and oils (=triglycerides of fatty acids) with ethylene oxide and/or propylene oxide in the presence of basic catalysts. Examples of fats and oils which can be used for this are coconut butter, palm kernel oil, tallow fat, lard, rape oil, soya bean oil, sunflower oil and thistle oil. Examples of basic catalysts which can be used for this are alkaline metal hydroxides and alcoholates, in particular oil-soluble alcoholates, such as potassium propylene glycolate.

If the fats and oils are reacted with ethylene oxide and propylene oxide, products can form which are analogous to the formulae (I) or (II), in which case n is then, however, an integer or a fractional number from 0.5 to 3 and St then represents the radical of a glycerol molecule additionally containing 2.5 to 0 fatty acid radicals.

If the fats and oils are reacted only with ethylene oxide or only with propylene oxide, products of the formulae (III ) or (IV) can form.

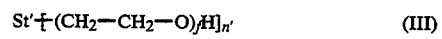

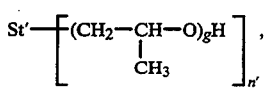

in which

St' represents the radical of a glycerol molecule still containing 2.5 to 0 fatty acid radicals, n' represents an integer or a fractional number from 0.5 to 3 and f and g are each an integer or a fractional number from 2 to 30, preferably 3 to 15.

If n', f and g and the number mentioned under St' are fractional numbers, these are average values characterising the mixtures of different molecules of the formulae (III) or (IV).

The polyethers derived from vegetable and animal fats and oils can have, for example, molecular weights in the range from 1,000 to 3,000, preferably in the range from 1,300 to 2,500.

Polyethers to be used for the present invention are often compounds known per se which are commercially available or, if desired, can be prepared in a manner known per se (see, for example, German Offenlegungsschrift 2,756,770, German Offenlegungsschrift 3,330,197, U.S. Pat. Nos. 4,481,367, 2,979,528, 2,674,619, 3,472,781, 4,452,712, 2,677,700, European Offenlegungsschrift 54,953, European Patent Specification 47,371, European Offenlegungsschrift 116,564, European Offenlegungsschrift 109,515, GDR Patent Specification 237,178, German Offenlegungsschrift 2,220,338, Macromolecules 20, pages 3089-3091 (1987) and Technical Data on Pluronic ® Polyols, a newsletter from BASF-Wyandotte Corp.). The preparation of polyethers derived from vegetable and animal fats and oils is described above and in the examples.

The polyethers to be used according to the invention can be added to the mixing water, for example, during the production of gypsum materials. If they are present as water-soluble and/or water-dispersible solids, they can be added, for example, to the mixing water and/or to the gypsum powder. However, they can also be used, for example, in the form of master batch granules together with gypsum or other powders which may be inert.

A particular embodiment of the materials according to the invention is characterised in that they additionally contain polyurethanes and/or polyurethane-ureas as organic additives. Materials according to the invention of this embodiment can contain, for example, a total of 0.02 to 50% by weight of polyurethanes, polyurethane-ureas and polyethers in the hardened state. This amount is preferably 0.05 to 10% by weight, particularly preferably 0.2 to 3% by weight.

Polyurethanes and/or polyurethane-ureas are in general used in the form of an aqueous dispersion or solution. The solids content of such dispersions can be, for example, 0.5 to 50% by weight. Preferably, it is 1 to 10% by weight. The overall amounts of water which can be used for producing the materials according to the invention of this type are as stated above. It must only be ensured that the water in this case is introduced entirely or in part in the form of the polyurethane and/or polyurethane-urea dispersion.

Polyurethanes and/or polyurethane-ureas suitable for this embodiment of the present invention in general contain hydrophilic groups. These can be, for example, a) ionic groups, b) groups which can be converted into ionic groups by a neutralisation reaction and/or c) ethylene oxide units incorporated in the polyether chains present in the polyurethane or polyurethane-urea.

In principle, any customary aqueous polyurethane(urea)dispersions which, possibly by virtue of containing alcohols, and, if desired, further organic solvents, are substantially insensitive to coagulation, are suitable. A number of processes for the preparation of suitable polyurethane(urea)dispersions in water are known. A comprehensive list is given, for example, by D. Dieterich and H. Reiff in "Die Angewandte Makromolekulare Chemie", 26, pages 85–106 (1972), D. Dieterich et al. in "Angewandte Chemie", 82, pages 53–63 (1970), D. Dieterich et al. in J. Oil Col. Chem. Assoc. 53, pages 363–379 (1970), D. Dieterich in "Die Angewandte Makromolekulare Chemie", 98, pages 133–158 (1981) and in "Chemie und Technologie makromolekularer Stoffe" [Chemistry and Technology of Macromolecular Compounds] (29th Publication of Fachhochschule Aachen on the occasion of the 9th Colloquium on 8 May 1981 at FH Aachen, Department of Chemical Engineering). Unless expressly stated otherwise, in the following the term "polyurethane" is also understood to mean urea-containing polymers, i.e. polyurethane-ureas.

A preferred process for preparing suitable aqueous polyurethane dispersions consists in reacting an NCO prepolymer dissolved, for example, in an organic solvent with a chain-lengthening agent. Either the prepolymer or the chain-lengthening agent contains ionic groups or groups capable of ion formation. In the course of the polyaddition reaction or afterwards, these groups capable of ion formation can then be converted into ionic groups. The aqueous dispersion can be formed at the same time or afterwards, for example by addition of water and removal of the organic solvent by distillation.

Further details regarding the polyurethane dispersions to be used and their preparation can be taken, for example, from German Offenlegungsschrift 3,320,217.

The hydrophilic or potentially hydrophilic groups are in general present in the polyurethanes to be used in such amounts that dispersibility of the polyurethanes in water is ensured. The hydrophilic group content of the polyurethanes can be, for example, 30 to 130 milliequivalents per 100 g of polyurethane solid, if only ionic groups and/or groups which can be converted into ionic groups are used. If only ethylene oxide units are used as hydrophilic groups, their content in the polyether chains can be, for example, 2 to 20% by weight. If both types of hydrophilic groups are present, 0.1 to 40 milliequivalents of ionic groups and/or groups which can be converted into ionic groups per 100 g of polyurethane solid and simultaneously 0.5 to 10% by weight of polyethylene oxide units within the polyether chains are preferably present in the polyurethanes.

Instead of polyurethanes and/or polyurethane-ureas or in a mixture with polyurethanes and/or polyurethane-ureas, other polymers can also be present as organic additives in the materials according to the invention. Thus, other polymers can also be introduced as organic additives, for example, in the form of products known per se, such as polybutadiene, polybutadiene/styrene, polyvinyl acetate, polystyrene/(meth)acrylate and/or polybutadiene/styrene/acrylonitrile dispersions. In principle, aqueous dispersions of any monomers which are copolymerisable with one another are suitable organic additives, of which butadiene, styrene, acrylonitrile, various alkyl acrylates, various methacrylates, maleic acid derivatives, olefins and other vinyl and diene monomers may be mentioned as monomers.

Of particular interest are vinyl acetate ethylene copolymers and rubber lattices. Polysiloxane dispersions containing, if desired, reactive groups and other reactive systems, such as polyisocyanate prepolymers, unsaturated polyester resins and epoxy resins and emulsions of monomers which, after mixing with gypsum and water, can be made to react are also suitable.

For the preparation of these dispersions, the following examples of olefinically unsaturated monomers may be mentioned:

a) $\alpha,\beta$-olefinically unsaturated monocarboxylic acids having 3 to 5 C atoms and esters or nitriles and amides thereof, such as acrylic, methacrylic and crotonic acid, acrylamides and methacrylamides, acrylonitrile and methacrylonitrile, esters of acrylic and methacrylic acid, in particular those with saturated monohydric aliphatic or cycloaliphatic alcohols having 1 to 20 carbon atoms, such as esters of the acids mentioned with methyl alcohol, ethyl alcohol, propyl alcohol, isopropyl alcohol, n-butyl alcohol, isobutyl alcohol, hexyl alcohol, 2-ethylhexyl alcohol, octyl alcohol, stearyl alcohol, cyclohexanol, methylcyclohexanol, further with benzyl alcohol, phenol, cresol, furfuryl alcohol, monoesters of $\alpha,\beta$-monoolefinically unsaturated monocarboxylic acids having 3 to 4 C atoms with dihydric saturated aliphatic alcohols having 2 to 4 C atoms, such as, for example, 2-hydroxypropyl acrylate, 4-hydroxybutyl acrylate, glycidyl esters of acrylic and methacrylic acid, such as glycidyl (meth)acrylate, aminoalkyl esters and aminoalkylamides of acrylic and methacrylic acid, such as 2-aminoethyl (meth)acrylate hydrochloride, N,N-dimethylaminoethyl (meth) acrylate, N,N-dimethylaminopropylacrylamide.

Monomers having two or more double bonds in the molecule can also be used. Examples of suitable monomers of this type are ethylene glycol diacrylate or ethylene glycol dimethacrylate.

b) $\alpha,\beta$-Olefinically unsaturated dicarboxylic acids having 3 to 5 C atoms and their derivatives, such as fumaric acid, maleic acid, itaconic acid, mono- and diesters of the abovementioned dicarboxylic acids having 1 to 18 C atoms in the alcohol radical, such as dimethyl maleate, diethyl maleate, dibutyl maleate, monohexyl maleate, monocyclohexyl maleate.

c) Mono- and diesters of vinyl alcohol with carboxylic acids or with hydrohalic acids, vinyl ethers, vinyl ketones, vinylamides, such as vinyl acetate, vinyl propionate, vinyl laurate, vinyl stearate, vinyl benzoate, chlorovinyl acetate, divinyl adipate, vinyl chloride, vinylidene chloride, vinyl ethyl ether, vinyl butyl ether, vinyl ethyl ether or vinyl isobutyl ether, vinyl ethyl ketone, vinylformamide, N-vinylacetamide.

d) Vinyl compounds of aromatics and heterocyclics, such as styrene, α-methylstyrene, vinyltoluene, p-chlorostyrene, divinylbenzene, 2-vinylpyrrolidone, 2-vinylpyridine.

e) N-Methylol ethers of acrylamide and methacrylamide of the general formula

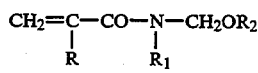

in which
R represents hydrogen or methyl,
$R_1$ represents hydrogen, alkyl, aralkyl or aryl,
$R_2$ represents alkyl or cycloalkyl, such as, for example, methyl, ethyl, n-propyl, isopropyl, n-butyl, isobutyl, cyclohexyl (see DE-B-1,035,363), furthermore the non-esterified N-methylol compounds of acrylamide and methacrylamide.

f) Mannich bases of acrylamide and methacrylamide of the general formula

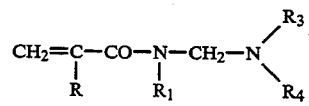

in which R and $R_1$ have the same meaning as above and $R_3$ and $R_4$ represent alkyl, cycloalkyl or together a heterocyclic radical, such as the morpholine radical. Suitable compounds of this type are mentioned in DE-B-1,102,404.

g) Acrylic acid and methacrylic acid derivatives having a terminal halogenomethylcarbonyl group of the general formula

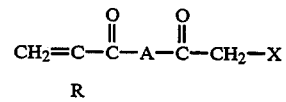

in which
R represents hydrogen or methyl,
A represents

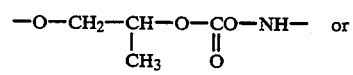

or

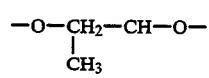

and
X represents chlorine or bromine (see BE-A-696,010).

h) Allyl compounds, such as triallyl cyanurate, triallyl phosphate, allyl alcohol, allylamine.

i) Monoolefinically unsaturated aliphatic hydrocarbons having 2 to 6 C atoms, such as ethylene, propylene, butylene, isobutylene.

j) Conjugated diolefins having 4 to 6 C atoms, such as butadiene, isoprene, 2,3-dimethylbutadiene, chlorobutadiene.

k) Furthermore norbornene and hydroxymethylnorbornene.

Preferably, the following are used:
Acrylic and methacrylic esters having 1 to 12 C atoms in the alcohol radical, acrylic acid, methacrylic acid and the $C_2$–$C_4$-hydroxyalkyl esters of these acids, styrene, acrylonitrile and methacrylonitrile, vinyl acetate, vinyl propionate, vinyl chloride, vinylidene chloride, ethylene or propylene in combination with one or more of the monomers listed.

These monomers are in general (co)polymerised at temperatures from 10° to 150° C.

Suitable initiators are in general 0.05 to 5% by weight, relative to the monomers, of initiators decomposing into free radicals. Examples of such initiators are organic peroxides, such as, for example, lauroyl peroxide, cyclohexanone hydroperoxide, tert.-butyl peroctoate, tert.-butyl perpivalate, tert.-butyl perbenzoate, dichlorobenzoyl peroxide, benzoyl peroxide, di-tert.-butyl peroxide, tert.-butyl hydroperoxide, cumine hydroperoxide, peroxycarbonates, such as diisopropyl peroxydicarbonate, dicyclohexyl peroxydicarbonate, diisooctyl peroxydicarbonate, sulphonyl peroxides, such as acetylcyclohexylsulphonyl peracetate, sulphonyl hydrazides, azo compounds, such as azodiisobutyronitrile and water-soluble azo compounds, such as described, for example, in German Auslegeschrift 2,841,045.

Inorganic peroxides, such as hydrogen peroxide, potassium peroxodisulphate and ammonium peroxodisulphate are also suitable.

The initiators decomposing into free radicals can be used alone or else in combination with reducing agents or heavy metal compounds. Examples of such compounds are sodium pyrosulphite or potassium pyrosulphite, formic acid, ascorbic acid, thiourea, hydrazine and amine derivatives, Rongalite. The heavy metal compounds can be present either in oil-soluble or in water-soluble form. Examples of water-soluble heavy metal compounds are silver nitrate, halides or sulphates of di- or trivalent iron, cobalt, nickel, salts of titanium or vanadium in low oxidation states. Examples of oil-soluble heavy metal compounds are cobalt naphthenate or the acetylacetone complexes of vanadium, cobalt, titanium, nickel or iron.

The polymerisation is in general carried out at a pH of 2 to 10, preferably 4 to 9, while a pH of below 7 is preferred when cationic oligourethanes are used and a pH of above 6 for anionic oligourethanes. The pH is adjusted within the ranges mentioned often by the addition of aqueous ammonia if acid groups are present in the reaction mixture.

The molecular weights of the polymers can be regulated by using conventional regulators, for example n-dodecylthiol, t-dodecylthiol, diisopropyl dixanthate, thioglycol and thioglycerol. They are in general added in amounts of 0.1 to 2% by weight, relative to the monomer mixture.

The emulsion polymerisation in aqueous medium can be carried out by known polymerisation processes either batchwise or continuously or by the feed process. The continuous and the feed process are particularly preferred. In the latter, water is initially introduced under a nitrogen atmosphere together with a portion or the entire emulsifier system and, if desired, a portion of the monomer mixture, the mixture is heated to the polymerisation temperature, and the monomer mixture and the initiator and, if desired, emulsifier are added dropwise over a period of 0.5 to 10 hours, preferably 1 to 6 hours.

After a certain period, the mixture is reactivated, and the reaction is completed until a conversion of about 99.0% to 99.9% by weight has been reached. Residual monomers and any organic solvent still present can be removed after the emulsion polymerisation, if desired together with the water present or a portion thereof, by distillation in vacuo. Then, if desired, further water can be added, ultimately resulting in 10 to 60% strength by weight, preferably 20 to 50% strength by weight dispersions, as the process product.

Depending on the reaction conditions, the average particle diameters measured by laser scattered light correlation spectroscopy are between 20 and 1000 nm, preferably between 50 and 500 nm. Dispersions having particle sizes of below 50 nm appear transparent, while those having larger particles appear increasingly cloudy.

The dispersions can be blended with dispersions of the same charge, such as, for example, with polyvinyl acetate, polyethylene, polystyrene, polybutadiene, polyvinyl chloride and polyacrylate dispersions.

Finally, fillers, plasticisers, pigments, hydrofluoric acid and silicic acid sols, aluminum and clay dispersions can also be incorporated.

Polymers other than polyurethanes and/or polyurethane-ureas can also be used, for example in the form of aqueous dispersions having a solids content of 1 to 50% by weight and in such amounts that, relative to the hardened material, 0.02 to 50% by weight of polyurethanes, polyurethane-ureas, polyethers and/or other polymers are present.

In a particularly preferred embodiment of the invention, there is now provided a gypsum-based material containing a polyether selected from the group consisting of polyethers of the formula (I), polyethers of the formula (II)

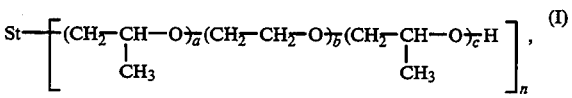

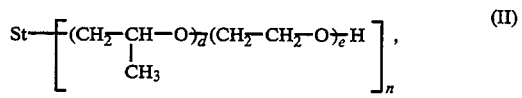

in each of which

St represents the radical of a starter molecule, n represents the number of reactive hydrogen atoms originally present in the starter molecule, a represents an integer or a fractional number from 17 to 23, b represents an integer or a fractional number from 3 to 6, c represents an integer or a fractional number from 1 to 6, d represents an integer or a fractional number from 17 to 213, and e represents an integer or a fractional number from 3 to 15, polyethers obtained from vegetable or animal fats or oils by reaction with ethylene oxide and/or propylene oxide in the presence of basic catalysts, and mixtures of said polyethers; and also containing an organic additive selected from the group consisting of polyurethanes, polyurethane-ureas, polybutadiene, polybutadiene/styrene, polyvinyl acetate, polystyrene/(meth)acrylate, polybutadiene/styrene/acrylonitrile, and mixtures thereof.

Materials according to the invention can be prepared, for example, by first mixing water and polyether or an aqueous polymer dispersion, polyether and, if desired, water in the desired amounts, then adding the desired amount of gypsum to this mixture with stirring, and allowing the mixture then present to harden, if desired with shaping. Examples of suitable temperatures for the preparation of the mixture of the components are 10° to 40° C. for the hardening 10° to 70° C. If desired, mixing of polyether and gypsum can be followed by deaeration under vacuum, if appropriate using a polymer dispersion or water, in order to remove air inclusions. Gypsum can be used, for example, in the form of anhydrous gypsum or anhydrite.

Materials according to the invention prepared in this manner and possibly present in a certain shape can be, for example, filed, worked with a knife, ground, sawed, bored, coated and metallised. They are nonflammable. Upon treatment with water, these materials absorb water which they release again virtually completely upon drying in air. Upon storage in water, in particular polymer-containing materials according to the invention substantially retain their strength, whereas a moulded article stored in water and produced only from gypsum disintegrates upon exposure to the slightest mechanical stress.

Materials according to the invention are suitable, for example, for the production of slabs for use in the building sector. If desired, for example, fillers and/or dyestuffs can be added to the materials. Examples of suitable fillers are: in each case, up to 10% by weight, but not more than a total of up to 50% by weight (relative to the entire mixture) of Kieselgur, ground pumice, carbon black, prepared chalk, ground slate, glass wool, aluminum powder, silicate materials (e.g. clay), aluminosilicates, kaolins, finely divided mica, glass fibres, cotton fibres, polyamide fibres, polyacrylonitrile fibres, cellulose fibres, polyester fibres, wood flour, cotton linters, polymethylene-ureas, titanium dioxide, hydrated alumina, finely divided lead, lead oxides, iron oxides, azulmic acid, starch and/or paper, in particular defibred waste paper. Examples of suitable dyestuffs are: azo, anthraquinone, pigment and phthalocyanine dyestuffs and optical brighteners and fluorescent and/or luminescent dyestuffs.

The slabs made from the materials according to the invention can be, for example, bonded or covered with tiles, veneers and/or plastics when used in the building sector. Moreover, they have excellent heat-insulating properties.

Materials according to the invention can also be used in the building sector for improving plasters, mortars, insulating materials or other construction materials.

Polymer-containing materials according to the invention are especially also suitable for casts in medical applications. For this purpose, for example, commercially available gypsum bandages can be impregnated with an aqueous polymer dispersion and a polyether polyol and the cast can then be manufactured by customary techniques.

Furthermore, materials according to the invention are suitable for improving gypsum moulds, for example with respect to their mechanical stability.

It is highly surprising that materials according to the invention in general constitute a homogeneous material and have reproducibly improved mechanical properties (for example bending resistance and compressive strength). The use of hydrated gypsum as filler for polymers, which is known per se, does not result in analogous improvements in properties. If aqueous polymer dispersions and hydrated gypsum are used for the production of materials for the purpose of comparison, and the water is allowed to evaporate, an inhomogeneous material with respect to the breaking resistance compared with the unfilled polymer is obtained.

The same negative result is obtained if a polymer sheet of excellent mechanical properties is dissolved in a mixture of toluene and isopropanol, anhydrous gypsum is added to this solution, and the amount of water in ethanol necessary for setting the gypsum is added. In this case, the mixture is first homogeneous, but after evaporation of the solvent a brittle, inhomogeneous polymer/gypsum material without any mechanical strength is obtained.

The fact that the setting times of polymer/gypsum materials can be regulated according to the invention by additions of alcohol is also highly surprising. Thus, upon mixing 100 g of anhydrous gypsum with 100 g of a 50% strength by weight polyurethane-urea dispersion in 20 ml of ethanol, a homogeneous mixture is obtained which after being poured onto a plastic slab sets within 15 minutes. After 2 days, the material reaches its final properties with respect to breaking and water resistance. In contrast, if 100 g of anhydrous gypsum are mixed with 100 g of the same 50% strength by weight polyurethane dispersion without the addition of ethanol, the material sets similarly to pure gypsum after as little as 3 minutes. After 2 days, the material thus obtained has reached its final properties, which differ only a little from that of a slab whose setting has been delayed by means of ethanol.

The examples which follow illustrate the present invention in more detail.

Examples

Polyether (PE) used:

PE 1

Polyether of the formula (I) started with trimethylolpropane having an a of 19, b of 3, c of 1.4, an OH number of 40 and a molecular weight of 4000.

PE 2

Polyether of the formula (II) started with propylene glycol having a d of 20, e of 4, an OH number of 41 and a molecular weight of 2750.

PE 3

Polyether of the formula (II) started with propylene glycol having a d of 20, e of 5, an OH number of 40 and a molecular weight of 2800.

PE 4

Polyether of the formula (I) started with glycerol having an a of 19, b of 3, c of 1.4, an OH number of 41.6 and a molecular weight of 4500.

PE 5

Polyether of the formula (I) started with trimethylolpropane having an a of 18, b of 3, c of 2.2, an OH number of 42.5 and a molecular weight of 4000.

PE 6

Polyether of the formula (I) started with trimethylolpropane having an a of 17.5, b of 4.4, c of 1.3, an OH number of 41.5 and a molecular weight of 4000.

PE 7

Polyether of the formula (I) started with propylene glycol having an a of 18.5, b of 2.9, c of 1.3, an OH number of 44.2 and a molecular weight of 2500.

PE 8

In an autoclave equipped for ethoxylations, 9 g of sodium hydroxide powder were added to 850 g of rape oil, and the mixture was dried by heating to 130° C. in vacuo. 594 g of ethylene oxide were then metered in with thorough stirring. The first portions of ethylene oxide were added slowly, and the rest, after the reaction had started, swiftly. The reaction took a total of 5 hours. The product thus obtained was washed once at 85° C. with one liter of a 1% strength sodium sulphate solution and twice with 500 ml each time of water, the oil was then separated off and dried in vacuo. The product thus isolated contained 41% by weight of ethylene glycol ether groups, relative to the rape oil.

PE 9

700 g of coconut butter were initially introduced into a stirred autoclave and melted by heating to 100° C. By applying a vacuum at the same time, the coconut butter and the apparatus were completely dried. 50 g of potassium propylene glycolate solution were then added. The latter had been obtained by dissolving 7 g of potassium hydroxide in 60 g of propylene glycol and distilling off water and excess propylene glycol at a slight vacuum. After heating of the batch to 125° C. under nitrogen, 870 g of propylene oxide were run in with thorough stirring, while maintaining a pressure of less than 3 PA. At the end of the reaction, it was allowed to continue at 125° C. for another hour, until the pressure had dropped. The oil obtained was washed, dried and isolated as described in detail under PE 8. The propylene glycol ether content of the product was 124% by weight, relative to the coconut butter used.

Example 1

1.3 g of polyether PE 1 were added to 500 g of deionised water, and the mixture was stirred at 420 rpm for 15 minutes. 800 g of commercially available anhydrous moulding plaster were added, the reaction mixture was stirred for another 30 seconds and then cast into moulds. After a residence time of 1 hour, the moulded articles (dimensions: 160×40×40 mm) were removed from the moulds, then stored at room temperature for 2 hours, at 40° C. for 48 hours and after cooling to room temperature for another 18 days. After this, the moulded articles had the following properties:

Bending strength in accordance with DIN 1164: 7.1 N/mm$^2$

Water absorption after 20 minutes: 34.0 g (specimen placed upright in water).

These methods of measurement were used in all examples.

Comparative Example 1

A moulded article produced under otherwise identical conditions but without addition of the polyether had the following properties:

Bending strength: 5.8 N/mm$^2$
Water absorption after 20 minutes: 45.3 g.

Examples 2 to 4

The procedure of Example 1 was repeated, except that different amounts of polyether PE 1 were used. The moulded articles obtained had the following properties:

| Example No. | Polyether (g) | Bending strength (N/mm$^2$) | Water absorption (g) |
| --- | --- | --- | --- |
| 2 | 0.65 | 6.2 | 36.4 |
| 3 | 2.6 | 6.7 | 33.2 |
| 4 | 5.2 | 6.6 | 32.2 |

Examples 5 to 8

The procedure of Examples 1 to 4 was repeated, except that polyether PE 2 was used, giving moulded articles having the properties listed below:

| Example No. | Polyether (g) | Bending strength (N/mm$^2$) | Water absorption (g) |
| --- | --- | --- | --- |
| 5 | 0.65 | 7.1 | 36.2 |
| 6 | 1.3 | 7.4 | 33.6 |
| 7 | 2.6 | 7.4 | 33.5 |
| 8 | 5.2 | 6.5 | 32.8 |

Examples 9 to 13

The procedure of Examples 1 to 4 was repeated, except that commercially available stucco was used instead of the moulding plaster. The moulded articles obtained had the following properties:

| Example No. | Polyether (g) | Bending strength (N/mm$^2$) | Water absorption (g) |
| --- | --- | --- | --- |
| 9 | (PE 1)0.8 | 6.7 | 24.3 |
| 10 | (PE 1)1.6 | 6.7 | 25.3 |
| 11 | (PE 2)0.5 | 6.95 | 29.1 |
| 12 | (PE 2)1.0 | 7.05 | 26.2 |
| 13 | (PE 2)2.0 | 6.15 | 26.0 |

Comparative Example 2

The procedure of Examples 9 to 13 was repeated, except that no polyether was added, giving moulded articles having the properties listed below:
Bending strength: 6.0 N/mm$^2$
Water absorption after 20 minutes: 40.2 g Example 14

The procedure of Example 1 was repeated, except that 40 g of a 50% strength by weight aqueous polyurethane dispersion was added to the mixture before adding the moulding plaster, and the mixture was stirred for another 2 minutes, giving moulded articles having the following properties:
Bending strength: 8.8 N/mm$^2$
Compressive strength: 112.4 N/mm$^2$
Water absorption after 20 minutes: 24.9 g.

Examples 15 to 29a

The procedure as described in Example 14 was repeated, except that the polyurethane dispersion was used in varying amounts and various polyethers were used in varying amounts.

| Example | Polyurethane (% by weight solid/solid)*) | Polyether (type) | Polyether (% by weight solid/solid)*) | Bending strength (N/mm$^2$) | Water absorption (g) |
| --- | --- | --- | --- | --- | --- |
| 15 | 1 | PE 1 | 0.15 | 7.9 | 24.4 |

-continued

| Example | Polyurethane (% by weight solid/solid)*) | Polyether (type) | Polyether (% by weight solid/solid)*) | Bending strength (N/mm²) | Water absorption (g) | |
|---|---|---|---|---|---|---|
| 16 | 1 | PE 1 | 0.08 | 8.9 | 25.3 | |
| 17 | 5 | PE 2 | 0.15 | 8.8 | 18.8 | |
| 18 | 5 | PE 2 | 0.80 | 9.0 | 17.8 | |
| 19 | 5 | PE 1 | 0.15 | 11.3 | 20.8 | |
| 20 | 5 | PE 1 | 0.80 | 9.7 | 19.4 | |
| 21 | 1 | PE 1 | 0.15 | 8.0 | 25.8 | |
| 22 | 2.5 | PE 1 | 0.15 | 8.3 | 21.4 | |
| 23 | 5 | PE 1 | 0.08 | 8.7 | 21.4 | |
| 24 | 5 | PE 4 | 0.08 | 9.5 | 23.3 | |
| 25 | 5 | PE 5 | 0.08 | 9.5 | 21.4 | |
| 26 | 5 | PE 6 | 0.08 | 8.4 | 22.0 | |
| 27 | 5 | PE 3 | 0.08 | 8.0 | 23.0 | |
| 28 | 5 | PE 7 | 0.08 | 8.3 | 22.0 | |
| 29 | 0.15 | — | — | 5.9 | 42.2 | for comparison |
| 29a | 1 | — | — | 5.9 | 32.4 | |

*)solid/solid here and in the tables below denotes polyurethane or polymer or polyether in each case calculated as anhydrous substance, relative to gypsum.

Examples 30 to 34

The procedure as described in Example 14 was repeated, except that polyethers PE 8 and PE 9 and commercially available stucco were used instead of moulding plaster.

| Example | Polyurethane (% by weight solid/solid) | Polyether (type) | Polyether (% by weight solid/solid) | Bending strength (N/mm²) | Water absorption (g) |
|---|---|---|---|---|---|
| 30 | 1.5 | PE 9 | 0.02 | 7.6 | 18.0 |
| 31 | — | PE 9 | 0.02 | 8.1 | 28.3 |
| 32 | 1.5 | PE 8 | 0.02 | 7.91 | 18.2 |
| 33 | — | PE 8 | 0.02 | 6.6 | 32.4 |
| 34*) | — | — | — | 6.3 | 39.1 |

*)for comparison

Examples 35-40

The procedure as described in Example 14 was repeated, except that other polymer dispersions were used instead of the polyurethane dispersion and commercially available stucco was used instead of moulding plaster.

Polymer type 1 was a dispersion containing polybutadiene/styrene.

Polymer type 2 was a dispersion containing polystyrene/butyl methacrylate.

| Example | Polyurethane (% by weight solid/solid) | Polyether (type) | Polyether (% by weight solid/solid) | Bending strength (N/mm²) | Water absorption (g) |
|---|---|---|---|---|---|
| 35 | 1/2.5 | PE 1 | 0.15 | 7.5 | 21.3 |
| 36 | 1/2.5 | PE 2 | 0.15 | 7.6 | 23.6 |
| 37 | 1/2.5 | PE 9 | 0.15 | 7.7 | 22.3 |
| 38 | 2/2.5 | PE 1 | 0.15 | 7.9 | 22.5 |
| 39 | 2/2.5 | PE 9 | 0.15 | 7.8 | 23.1 |
| 40*) | — | — | — | 6.3 | 39.1 |

*)for comparison

Examples 41 to 45

The procedure as described in Example 14 was repeated, except that polyethers PE 8 and PE 9 were used and a polyurethane dispersion obtained in the following manner was used in Examples 41 and 43:

0.25 mol of butoxyethoxybutanol (OH number 40), 0.25 mol of propylene oxide polyether (MW 1000), 0.40 mol of monosulphonated 1,4-butanediol, 1.2 mol of isophorone diisocyanate and 0.20 mol of hydroxyethylethylenediamine were reacted with one another to give a polyurethane dispersion containing 68% by weight of water.

| Example | Polyurethane (% by weight solid/solid) | Polyether (type) | Polyether (% by weight solid/solid) | Bending strength (N/mm²) | Water absorption (g) |
|---|---|---|---|---|---|
| 41 | 0.56 | PE 9 | 0.02 | 7.6 | 18.3 |
| 42 | — | PE 9 | 0.02 | 8.0 | 29.5 |
| 43 | 0.58 | PE 8 | 0.02 | 7.75 | 19.2 |
| 44 | — | PE 8 | 0.02 | 6.5 | 31.1 |
| 45*) | — | — | — | 6.3 | 39 |

*)for comparison

What is claimed is:

1. A gypsum based material containing organic additives and a polyether.

2. A material of claim 1, which contains in the hardened state 0.02 to 5% by weight of polyether.

3. A material of claim 1, in which the polyether is one of the formulae (I) and (II)

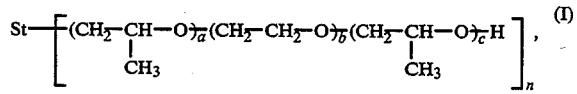

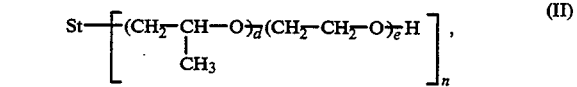

in which

St represents the radical of a starter molecule, n represents the number of reactive hydrogen atoms originally present in the starter molecule, a represents an integer or a fractional number from 17 to 23, b represents an integer or a fractional number from 3 to 6, c represents an integer or a fractional number from 1 to 6, d represents an integer or a fractional number from 17 to 23, and e represents an integer or a fractional number from 3 to 15, polyethers obtained from vegetable or animal fats or oils by reaction with ethylene oxide and/or propylene oxide in the presence of basic catalysts, and mixtures of said polyethers; and also containing an organic additive selected form the group consisting of polyurethanes, polyurethane-ureas, polybutadiene, polybutadiene/styrene, polyvinyl acetate, polystyrene/(meth)acrylate, polybutadiene/styrene/acrylonitrile, and mixtures thereof.

4. The material of claim 1, wherein said organic additive is selected from the group consisting of polyurethanes, polyurethane-ureas, polybutadiene, polybutadiene/styrene, polyvinyl acetate, polystyrene/(meth)acrylate, polybutadiene/styrene/acrylonitrile, and mixtures thereof.

5. The material of claim 4, wherein said organic additives and said polyethers are present in a total amount of 0.02 to 50% by weight of said material in the hardened state.

6. A process for the production of a material of claim 1, in which, relative to not yet set gypsum, 18 to 400% by weight of water, relative to the hardened material, 0.02 to 5% by weight of said polyether and said organic additive are mixed in such amount that, relative to the hardened material, a total of 0.02 to 50% by weight of said polyethers and said organic additives are present, and not yet hardened gypsum is added, and the mixture is allowed to harden.

7. The process of claim 6, in which the organic additives are used in the form of an aqueous dispersion having a solid content of 1 to 50% by weight.

8. A process of claim 6, in which mixing is carried out at 10° to 40° C. and hardening at 10° to 70° C.

9. A process of claim 6, in which the mixture is allowed to harden with shaping.

10. A gypsum-based material containing a polyether selected from the group consisting of polyethers of the formula (I), polyethers of the formula (II)

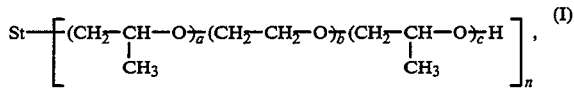

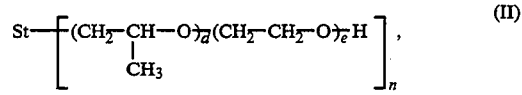

in each of which

St represents the radical of a starter molecule, n represents the number of reactive hydrogen atoms originally present in the starter molecule, a represents an integer or a fractional number from 17 to 23, b represents an integer or a fractional number from 3 to 6, c represents an integer or a fractional number from 1 to 6, d represents an integer or a fractional number from 17 to 23, and e represents an integer or a fractional number from 3 to 15, polyethers obtained from vegetable or animal fats or oils by reaction with ethylene oxide and/or propylene oxide in the presence of basic catalysts, and mixtures of said polyethers; and also containing an organic additive selected from the group consisting of polyurethanes, polyurethane-ureas, polybutadiene, polybutadiene/styrene, polyvinyl acetate, polystyrene/(meth)acrylate, polybutadiene/styrene/acrylonitrile, and mixtures thereof.

11. The material of claim 10, wherein said polyether is a polyether of formula (I) and said other polymer is a polyurethane.

* * * * *